United States Patent Office 3,002,970
Patented Oct. 3, 1961

3,002,970
18-OXYGENATED STEROIDS AND PROCESS FOR THEIR SYNTHESIS
Albert Wettstein and Karl Heusler, Basel, Hellmut Ueberwasser, Riehen, and Peter Wieland, Basel, Switzerland, assignors to Ciba Pharmaceutical Products Inc., Summit, N.J.
No Drawing. Filed Nov. 28, 1958, Ser. No. 776,691
Claims priority, application Switzerland Dec. 5, 1957
14 Claims. (Cl. 260—239.55)

Among the 18-oxygenated steroids the hormone aldosterone, isolated from adrenal glands, is of extreme importance, more especially because of its specific effect on mineral metabolism. Since, however, on one hand, the quantities in which it occurs in animal organs are too small for producing the hormone economically, and since, on the other hand, it has hitherto not been possible to prepare aldosterone by partial synthesis from other naturally occurring steroids, its manufacture by total synthesis is of considerable industrial importance.

The present invention provides a new process for synthesising aldosterone and its derivatives in a simple manner from a $\Delta^{4:18}$-3:16-dioxo-11$\beta$:18a-oxido-18a-methyl-18-homoandrostadiene of the formula

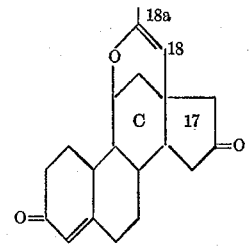

or from a corresponding 3-ketal which may contain a further double bond in the 14:15-position.

The new process can be subdivided into four main parts:

(A) Degradation of the cyclic enol ether grouping at ring C to the 18:11-cyclo-semiacetal structure typical of aldosterone;
(B) condensation with an oxalic acid ester in the 17-position and formation of derivatives to protect the 20-oxo group;
(C) hydrogenation of the 14:15-double bond and elimination of the oxygen grouping in the 16-position; and
(D) conversion of the side chain into the ketol side chain of aldosterone.

One variant of the synthesis is represented by the following formula scheme:

PART A

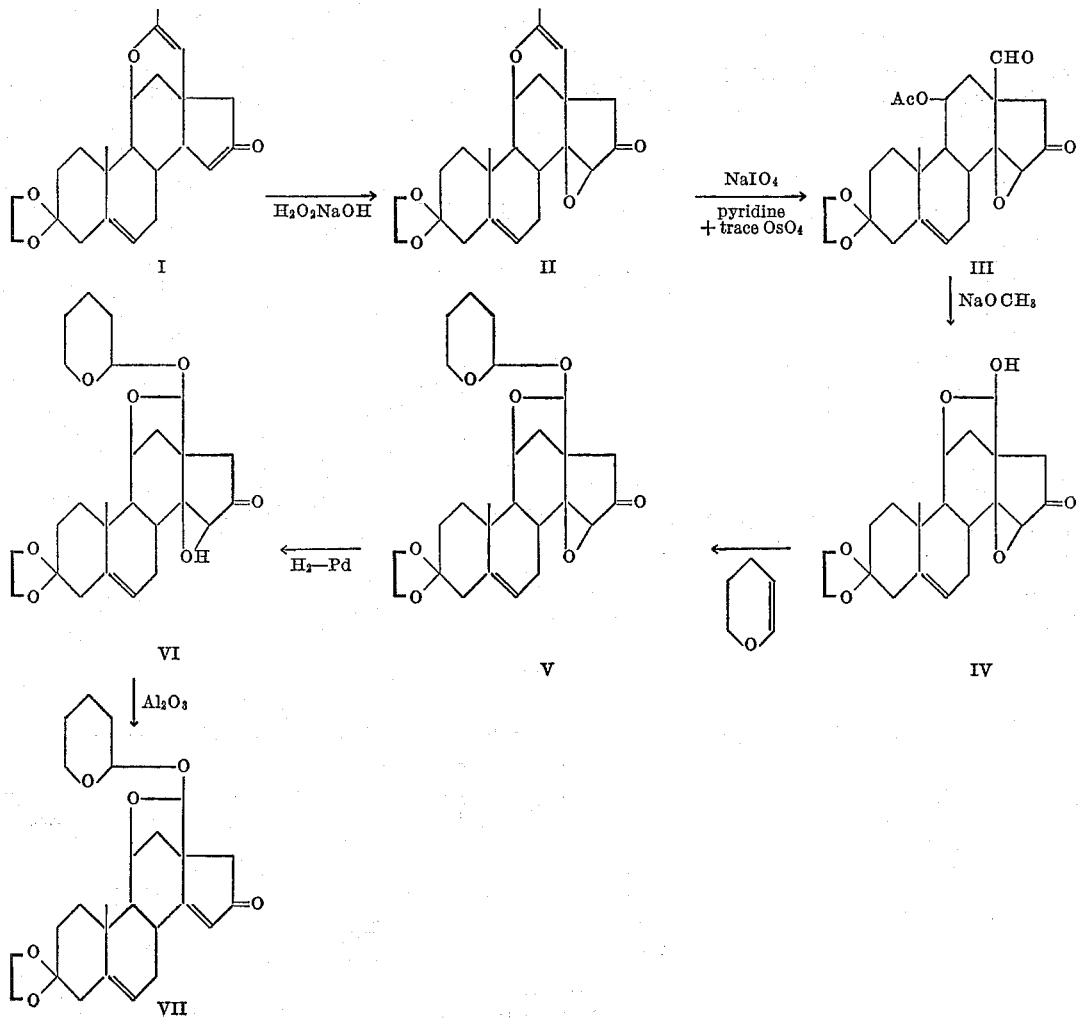

PART B
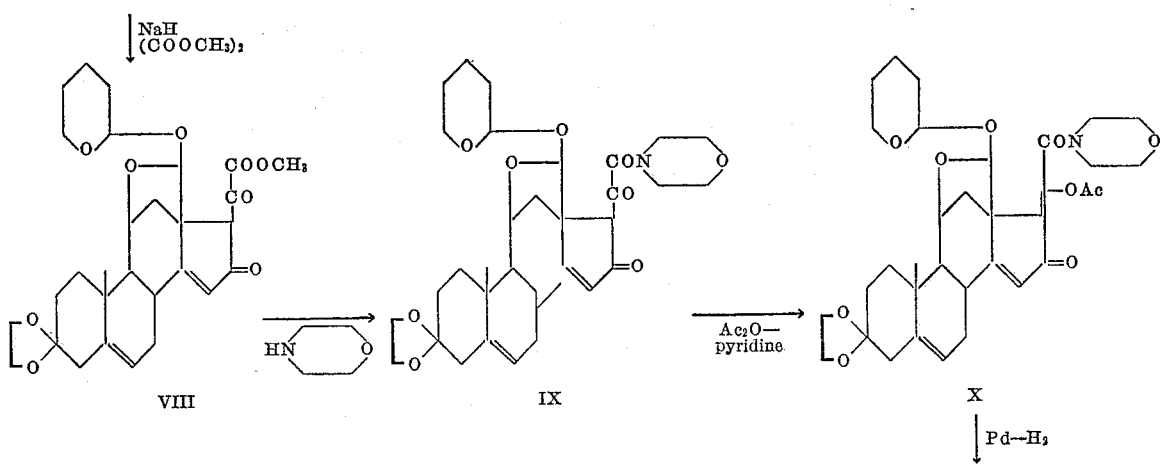
PART C
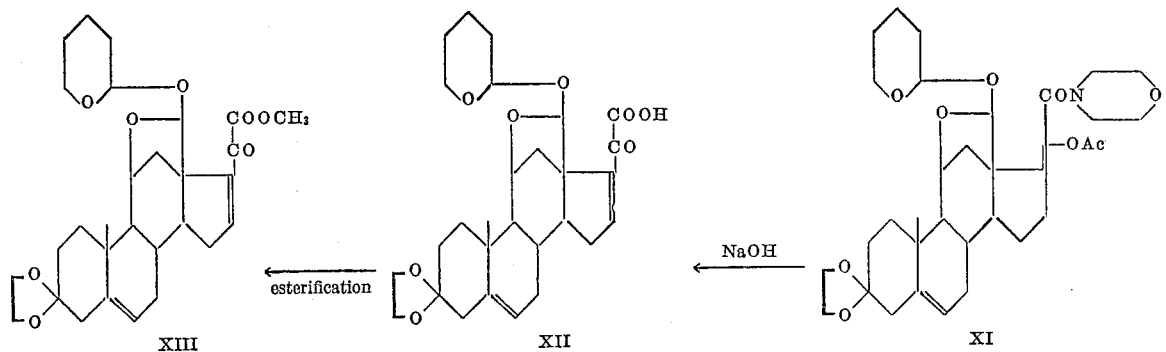
PART D
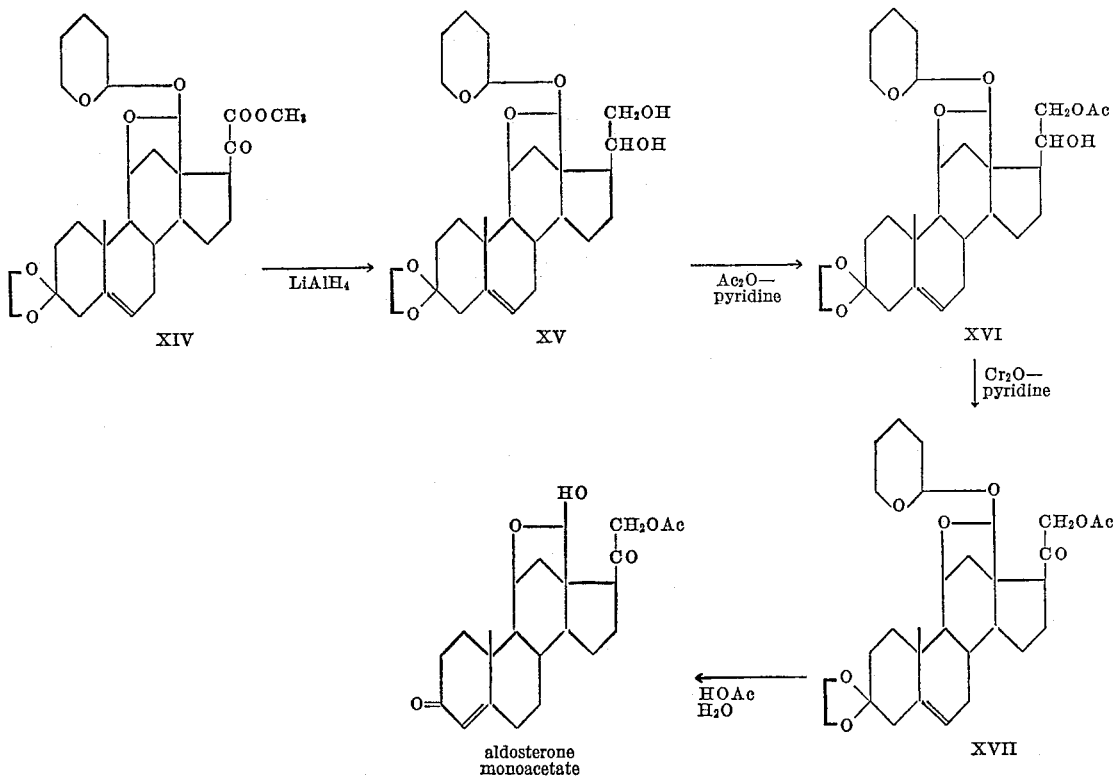

The present invention relates to Part B of the process described above thus more especially to the introduction of an oxalo-ester radical in the 17-position as well as to the preparation of derivatives to protect the 20-oxo group against reduction in the course of the hydrogenation reactions required in Part C.

The process according to the present specification consists in condensing a $\Delta^{14}$-16-oxo-androstene with an oxalic acid dialkyl (especially dilower alkyl) ester and, if desired, converting the ester group into an acid amide group by treatment with an amine and then etherifying or esterifying a free enolic hydroxyl group in the condensation product formed.

The condensation with an oxalic acid ester, for example with the dimethyl or diethyl ester of oxalic acid, is carried out in a manner known per se in the presence of an alkaline condensing agent such as an alkali metal alkoxide, for example sodium methoxide or ethoxide, potassium tertiary butoxide, an alkali metal amide or hydride, e.g. sodamide or sodium hydride. In contradistinction to the corresponding reaction in the case of saturated 16-oxo-androstanes, the condensation in the case of the $\Delta^{14}$-16-oxo-androstenes gives a high yield and takes place exclusively in the 17-position. The resulting oxalic acid esters are crystalline compounds and only a small share thereof is in the form of 16:20-dioxo compounds; in fact they are extensively enolised, both in the solid state and in dissolved form.

They can be converted into enol derivatives, especially enol ethers and enol esters. The etherification is performed in a manner, known per se, for example with diazomethane in an ethereal such as a di-lower alkyl-ether (e.g. dimethyl ether, diethyl ether, methylethyl ether), a cyclic ether, such as tetrahydrofurane, dioxane, etc./alcoholic (e.g. lower alkanol, such as methanol, ethanol, isopropanol, etc.) solution or with an alkyl (particularly lower alkyl) halide in the presence of an alkaline condensing agent, for example with isopropyl iodide and potassium (or other alkali metal) carbonate in acetone. This procedure yields in most cases mixtures of the 16- and 20-enol derivatives which can be separated from each other by crystallisation or chromatography. The two enol derivatives are easy to distinguish by their characteristic ultraviolet absorption maxima.

Surprisingly, the esterification of the oxalic acid ester condensation products leads invariably to a single type of enol ester, namely the 20-enol acylates which are, therefore, suitable for isolating the free oxalic acid esters which, owing to their non-uniform enolization, often crystallize less satisfactorily. The esterification is performed, for example, by reaction with a reactive derivative of a carboxylic acid, such as an acid anhydride or acid halide, in the presence of an acid-acceptor, such as a tertiary amine, for example pyridine, and if desired in the presence of an inert diluent, such as benzene, toluene, dioxane or tetrahydrofurane. Suitable esterifying agents, include anhydrides and acid halides of lower fatty acids (e.g. acetic, propionic and butyric acid), such as acetyl chloride, propionic acid anhydride, butyric acid anhydride, trimethylacetic acid bromide, etc.) or of monocyclic carbocyclic carboxylic acids (e.g. benzoyl chloride), phenyl substituted lower fatty acids (e.g. phenyl acetic acid chloride).

In the further course of the synthesis the 14:15-double bond must be saturated by catalytic hydrogenation without at the same time affecting also the 20-oxo group (in the case of 16-enol derivatives) or the 17:20-enol double bond (in the case of 20-enol derivatives). In the case of the 16-enol derivatives the 16:17-double bond is hydrogenated together with the 14:15-double bond.

While in the case of the 20-enol derivatives, and more especially the 20-enol esters it is possible to keep the enol double bond at least partially unchanged during the hydrogenation of the 14:15-double bond and the 16-oxo group, but the yield of enol acetate, or of the 20-ketone regenerated therefrom respectively, is low. It has now been observed that the enol double bond in $\Delta^{14:17}$-16-oxo-20-acyloxy-pregnadiene-21-acid amides—in contradistinction to the corresponding double bond in the 21-acid esters—is at most only very slightly hydrogenated during the catalytic hydrogenation.

Surprisingly, it is extremely simple to convert the $\Delta^{14}$-16:20-dioxo-pregnene-21-acid esters into the corresponding amides. This could not have been expected eo ipso, as it is known that on being treated with a primary or secondary amine the cyclohexanone-oxalic acid esters yield isatine derivatives, whereas under similar conditions the cyclopentanone-oxalic acid esters are split up into cyclopentanone and an oxalic acid diamide. When a $\Delta^{14}$-16:20-dioxo-pregnene-21-acid ester of the present invention is treated with a primary or secondary amine, neither the afore-mentioned cyclisation reaction nor cleavage occurs; in fact, the corresponding 21-acid amides are formed in a very good yield. The exchange of the ester group for the amide group is conducted in an anhydrous or aqueous medium, and can be performed even at room temperature without addition of a catalyst. Provided the reaction product is sufficiently stable, the reaction time can be shortened by heating. At least 2 molecular proportions of amine per molecular proportion of the ester are used. In an anhydrous medium, for example in benzene, when a secondary amine is used, the formation of the amide group is accompanied by the formation of an enamine at the 20-oxo group, whereas in an aqueous medium an enol salt is formed. The enamines are split even with water, for example by shaking a solution of an enamine in a solvent which is immiscible or only restrictedly miscible with water with an aqueous solution which can be rendered weakly acidic to neutralise the amine formed, for example, by addition of a dihydrogen phosphate. Alternatively, the amide can be prepared by using the amine itself as solvent. When the starting material is a $\Delta^{14:17}$-16-oxo-20-acyloxy-pregnadiene-21-acid ester, the formation of the 21-acid amide is accompanied by the aminolytic cleavage of the 20-acyloxy group to form the 20-oxo group.

The conversion of the 21-ester group into the amide group can be carried out with primary or secondary aliphatic, araliphatic, alicyclic, aromatic or heterocyclic amines, for example, lower alkyl and di-lower alkylamines, such as methylamine, ethylamine, isopropylamine, dimethylamine, diethylamine, methylethylamine, etc. phenyl lower alkylamines, such as benzylamine, phenethylamine, etc., carbocyclic aromatic amines, such as aniline, 2-aminotoluene, naphthylamine, etc., alicyclic amines, such as cyclopentylamine, cyclohexylamine, etc., and heterocyclic amines, such as pyrrolidine, piperidine, morpholine, etc., or with ammonia itself. When the reaction is performed in the absence of a diluent, the use of morpholine offers special advantage owing to its good solubility. Of course, other amines having similar solubility characteristics can be used in place of morpholine. The resulting $\Delta^{14}$-16:20-dioxo-pregnene-21-acid amides can, like the corresponding 21-esters, be converted into enol derivatives, enol ethers and enol esters. In this case, too, reaction with carboxylic acid derivatives, for example acetic acid (or other lower fatty acids, etc.) anhydride and pyridine, produces exclusively 20-enol esters.

The present invention further provides the esters and amides of $\Delta^{14}$-16:20-dioxo-pregnene-21-acids and their enol ethers and enol acylates, more especially compounds of the formula

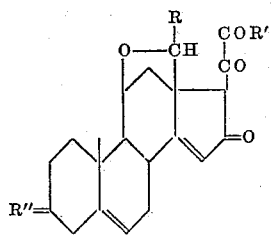

in which R represents a protected, especially an etherified, hydroxyl group, for example a tetrahydropyranyloxy group; R' represents an alkoxy group, such as a methoxy or ethoxy group, or a substituted amino group, for example a morpholino group; and R'' represents a ketalised oxo group, and the corresponding 20-enol acylates, for example enol acetates of the formula

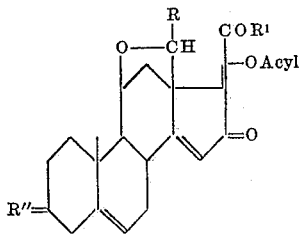

These compounds are valuable intermediates for the manufacture of aldosterone and of derivatives thereof.

The compounds obtained by the present process are racemates or optically active substances. Racemates can be split up in a manner known per se into optical antipodes.

The starting materials for the present process have been described in Indian Patent No. 52,534 corresponding to U.S. patent application No. 521,398 filed July 11, 1955 and in U.S. patent application Serial No. 776,690 filed concurrently herewith.

The process of the invention further includes variants thereof in which only some of the steps are carried out, if desired in a different order of succession, or in which the starting material is an intermediate obtained at any stage of the process and the remaining step or steps are performed.

The following examples illustrate the invention.

*Example 1*

10.4 grams of sodium metal are dissolved in 200 cc. of absolute methanol, and the sodium methylate resulting from evaporation in a water-jet vacuum is dried for 90 minutes at 160° C. under a pressure of 0.05 mm. Hg. A suspension of the methylate prepared in this manner in 300 cc. of absolute benzene is mixed with 21.1 grams of oxalic acid dimethyl ester, and the mixture is stirred in a current of nitrogen with exclusion of moisture at 0° C. for 15 minutes. A solution of 32.0 grams of d:l-$\Delta^{5:14:18}$ - 3 - ethylenedioxy - 11$\beta$:18a - oxido - 16 -oxo-18a-methyl-18-homo-androstatriene in 320 cc. of absolute benzene is run in, and the mixture is stirred on for 18 hours under nitrogen, during which time the temperature rises gradually to 25° C. After this time the whole is acidified with a mixture of 32.0 cc. of glacial acetic acid and 220 cc. of benzene, and the benzolic solution is repeatedly washed with water. The aqueous solutions are separately extracted once with methylene chloride. The organic solutions are combined, dried and evaporated under a pressure of about 15 mm. Hg under nitrogen in a water jet vacuum, the excess oxalic acid ester finally being removed by sublimation at 60° C. under 0.05 mm. Hg pressure. The crude reaction product (40.2 grams) is triturated with 150 cc. of ether and cooled. The ether-insoluble residue (34.60 grams) melting at 146–148° C. represents practically pure d:l-$\Delta^{5:14:18}$-3-ethylenedioxy-11$\beta$:18a-oxido-16:20-dioxo-18a-methyl- 18 - homo - pregnatriene-21-acid-methyl ester. Evaporation of the ethereal solution yields another 2.80 grams of the same compound, melting at 144–146.5° C.

A specimen, recrystallised from benzene+hexane and methylene chloride+methanol, forms pale-yellow crystals melting at 147–149° C.

On being reacted with ferric chloride in methanolic solution the compound turns the latter a deep brownish violet color. Ultraviolet spectrum in absolute alcohol: Maxima at 250 m$\mu$ ($\epsilon$=9150), 294 m$\mu$ ($\epsilon$=7250) and 334 m$\mu$ ($\epsilon$=6900), in 2×10$^{-4}$ N-caustic soda solution in absolute alcohol: maxima at 236 m$\mu$ ($\epsilon$=14400) and 340 m$\mu$ ($\epsilon$=12200). Infrared spectrum in methylene chloride solution: between 5.5$\mu$ and 6.25$\mu$ bands at 5.73$\mu$, 6.04$\mu$ (with inflexion at 5.95$\mu$ and shoulder at 6.15$\mu$) and 6.24$\mu$.

2.50 grams of the oxalic ester described above are dissolved in 70 cc. of acetone and refluxed with 5.0 grams of freshly calcined potassium carbonate and 5.0 cc. of isopropyl iodide for 23 hours at 80° C. bath temperature under nitrogen. The reaction mixture is then concentrated in a water-jet vacuum to about 20 cc. diluted with 150 cc. of benzene, the benzolic solution is repeatedly washed with water, and the aqueous extracts are extracted with benzene. Acidification of the aqueous alkaline solutions with potassium dihydrogen phosphate and extraction with methylene chloride yields 41 mg. of crystalline starting material. The benzolic solutions yield a total of 2.915 grams of a neutral product which crystallises readily from ether and which, according to its ultraviolet spectrum, contains about 60% of 20-enol ether and 40% of 16-enol ether. The mixture is chromatographed over 100 grams of alumina (activity II). The residue of the fraction elutriated with a total of 1.6 liters of a 1:1 mixture of benzene and hexane (500 mg.) yields on crystallisation from acetone+hexane 289 mg. of pure d:l - $\Delta^{5:14:16:18}$ - 3 - ethylenedioxy-11$\beta$:18a-oxido-16-isopropoxy-18a-methyl-20-oxo-18-homo-pregnatetraene - 21-acid methyl ester melting at 200 to 203° C. A specimen of this compound, recrystallised from benzene+hexane and methanol melts at 203–205° C.

Ultraviolet spectrum in absolute alcohol: Maxima at 230 m$\mu$ ($\epsilon$=11100) and at 340 m$\mu$ ($\epsilon$=10300), shoulder at 252 m$\mu$ ($\epsilon$=6700). Infrared spectrum in methylene chloride: Between 5.5$\mu$ and 6.75$\mu$ bands at 5.73$\mu$, 5.95$\mu$, 6.22$\mu$ and 6.52$\mu$.

A total of 800 cc. of benzene elutriates 610 mg. of mixtures. 1.2 liters of a 1:1 mixture of benzene and ether and 500 cc. of ether elutriate 1.30 grams of substance which is crystallised from ether and yields 631 mg. of pure d:l-$\Delta^{5:14:17:18}$-3-ethylene-dioxy-11$\beta$:18a-oxido-16-oxo-18a-methyl-20-isopropoxy-18-homo-pegnatetraene-21-acid methyl ester melting at 193–195° C. After having been recrystallized twice more from ether the compound melts at 194–195° C.

Ultraviolet spectrum in absolute alcohol: Maximum at 265 m$\mu$ ($\epsilon$=14400). Infrared spectrum in methylene chloride: 5.74$\mu$ (ester); 5.90$\mu$ (5-ring-ketone); shoulder at 5.94$\mu$ (dihydropyrane); 6.10$\mu$ (enol); 6.22$\mu$ ($\Delta^{14}$); and 9.10$\mu$ (ketal).

100 mg. of d:l-$\Delta^{5:14:16:18}$-3-ethylenedioxy-11$\beta$:18a-oxido - 16 - isopropoxy - 18a - methyl - 20 - oxo - 18 - homo-pregnatriene-21-acid methyl ester are dissolved in 30 cc. of absolute methanol and stirred with 100 mg. of 10% palladium carbon catalyst under hydrogen. Within 30 minutes the amount of hydrogen calculated for 2 molecular equivalents is taken up. The mixture is filtered and the filtrate is evaporated to yield 95 mg. of residue which crystallizes on being moistened with ether. Recrystallisation from methanol, acetone+ether and methanol+ether yields the d:l-$\Delta^{5:18}$-3-ethylenedioxy-11$\beta$:18a-oxido - 16 - isopropoxy - 18a - methyl - 20 - oxo - 18- homo-14:17-diiso-pregnadiene-21-acid methyl ester melting at 205–206° C. (with decomposition).

Infrared spectrum in methylene cholride: Between 5.5µ and 6µ bands at 5.77µ (inflexion at 5.70µ) and 5.95µ. 17 mg. of the above isopropyl ether are heated under 0.25 mm. Hg pressure for 30 minutes at 200–205° C., whereby a yellow oil is formed which displays in the ultraviolet spectrum an absorption maximum at 253µ (ε=4130) and contains the d:l-$\Delta^{5:16:18}$-3-ethylenedioxy-11β:18a - oxido - 18a - methyl - 20 - oxo - 18 - homo-14-isopregnatriene-21-acid methyl ester.

Example 2

500 mg. of sodium hydride in 10 cc. of benzene are stirred in a current of nitrogen with 1.2 cc. of oxalic acid diethyl ester and 0.3 cc. of absolute alcohol for 15 minutes. 1.0 gram of a d:l-$\Delta^{5:14:18}$-3-ethylenedioxy-11β:18a-oxido-16-oxo-18a-methyl-18-homo-handrostatriene in the form of a dry crystal powder is then added, and the whole is allowed to react while being stirred for 5 hours at 22–24° C. The dark-colored mixture is worked up by adding 5 cc. of absolute ether and 2 cc. of absolute alcohol and while stirring it a current of carbon dioxide is passed over the mixture until it brightens up, whereupon the mixture is introduced into a stirred emulsion of benzene and sodium dihydrogen phosphate solution. The organic layer is washed with water, dried over sodium sulfate, and freed in vacuo from benzene and in a high vacuum from the oxalic acid diethyl ester. The crystalline residue is washed with ether and recrystallized from absolute alcohol to yield 1.1 grams of d:l-$\Delta^{5:14:18}$-3-ethylenedioxy - 11β:18a - oxido - 16:20 - dioxo - 18a-methyl-18-homo-pregnatriene-21-acid ethyl ester melting at 163–164° C.

Example 3

3 grams of the d:l-$\Delta^{5:14:18}$-3-ethylenedioxy-11β:18a-oxido - 16:20 - dioxo - 18a - methyl - 18 - homo - pregnatriene-21-acid methyl ester described in Example 1 are dissolved in 30 cc. of ethyl acetate, cooled to −10° C., and reacted with 20 cc. of cooled ethereal diazo-methane solution of about 2.5% strength. After 2 minutes the reaction mixture is freed below 0° C. in vacuo from the excess of diazomethane and of solvents. The crude product is dissolved in 100 cc. of methanol and concentrated to 30 cc. to yield a first crystalline fraction of 950 mg. melting at 205–212° C. which is recrystallized from methanol to yield as the main product d:l-$\Delta^{5:14:17:18}$-3-ethylenedioxy - 11β:18a - oxido - 16 - oxo - 18a - methyl-20-methoxy-18-homo-pregnatetraene-21-acid methyl ester melting at 219–221° C. ($\lambda_{max}$=263 mµ; ε=14400). The second crystalline fraction—810 mg. of a product melting at 196–198° C.—is primarily a mixture of the 16- and 20-enol ethers.

However, if the etherification is performed at 0° to +5° C. in a mixture of benzene+ether instead of in ethyl acetate or in a mixture of dioxane, methanol and ether, the main product obtained is d:l-$\Delta^{5:14:16:18}$-3-ethylenedioxy - 11β:18a - oxido - 16 - methoxy - 18a - methyl-20-oxo-18-homo-pregnatetraene-21-acid methyl ester in the form of intensely yellow crystals melting at 226–228° C. ($\lambda_{max}$=340 mµ; ε=11000). The further conversion is performed exactly as described in Example 1 in connection with the reactions for the isopropyl ether.

Example 4

500 mg. of the d:l-$\Delta^{5:14:18}$-3-ethylenedioxy-11β:18a-oxido - 16:20 - dioxo - 18a - methyl - 18 - homo - pregnatriene-21-acid methyl ester described in Example 1 are stirred for a short time in 10 cc. of concentrated aqueous ammonium hydroxide until a clear solution results which is kept for 21 hours at 25° C.; during this time the ammonium salt of the amide formed separates out in crystalline form and is dissolved by adding 10 cc. of water; the solution is cooled with ice and acidified with 8 cc. of glacial acetic acid. After several hours the precipitate formed is suctioned off and washed with water. Yield: 500 mg. of crystalline amide. Crystallization from methylene chloride+methanol yields d:l-$\Delta^{5:14:18}$-3-ethylenedioxy - 11β:18a - oxido - 16:20 - dioxo - 18a - methyl-18-homo-pregnatriene-21-acid amide in the form of small yellow needles melting at 236–237° C. (with decomposition).

Ultraviolet spectrum in absolute alcohol: Maxima at 248 mµ (ε=7200) and at 358 mµ (ε=10200). Infrared spectrum in methylene chloride: Bands at 2.85µ and 2.96µ; furthermore between 5.75µ and 6.75µ bands at 6µ (broad), 6.18µ, 6.26µ, 6.4µ and 6.55µ. A dark-brown coloration is produced with ferric chloride in methanol.

Example 5

200 mg. of the d:l-$\Delta^{5:14:18}$-3-ethylenedioxy-11β:18a-oxido - 16:20 - dioxo - 18a - methyl - 18 - homo - pregnatriene-21-acid methyl ester, described in Example 1, are refluxed in 5 cc. of absolute benzene and 1 cc. of aniline for 10 hours at a bath temperature of 120° C. The benzene is then removed in a water-jet vacuum and the aniline in a high vacuum, and the residue is crystallized from ether to yield 130 mg. of d:l-$\Delta^{5:14:18}$-3-ethylenedioxy - 11β:18a - oxido - 16:20 - dioxo - 18a - methyl-18-homo-pregnatriene-21-acid anilide which melts at 219–221° C. after recrystallization from methanol, benzene+hexane and methanol.

Ultraviolet spectrum in absolute alcohol: Maxima at 234 mµ (ε=11480), 278 mµ (ε=9600) and 361 mµ (ε=12450). Infrared spectrum in methylene chloride: 3.03µ (N-H); between 5.75µ and 6.5µ inflexion at 5.97µ and bands at 6.05µ, 6.18µ, 6.23µ, 6.32µ and 6.42µ.

Example 6

500 mg. of the d:l-$\Delta^{5:14:18}$-3-ethylenedioxy-11β:18a-oxido-16:20 - dioxo - 18a-methyl-18-homo-pregnatriene-21-acid methyl ester, described in Example 1, are refluxed in 10 cc. of absolute benzene and 1.0 cc. of benzylamine for 2 hours at 115° C. bath temperature with exclusion of moisture. The volatile constituents are distilled off in a water-jet vacuum and in a high vacuum, and the residue is recrystallised from methanol+hexane+ether to yield 210 mg. of d:l-$\Delta^{5:14:18}$-3-ethylenedioxy-11β:18a-oxido-16:20-dioxo-18a-methyl-18-homo-pregnatriene - 21-acid benzylamide; on being once again recrystallized from methanol and benzene+hexane it is obtained in the form of pale-yellow crystals melting at 191–193° C. (with decomposition).

Ultraviolet spectrum in absolute alcohol: Maxima at 252 mµ (ε=8790) and 360 mµ (ε=10370). Infrared spectrum in methylene chloride: 2.97µ; between 5.75µ and 6.5µ bands at 5.95µ, 6.07µ, 6.17µ, 6.23µ and 6.40µ.

100 mg. of the above benzylamide in 1.0 cc. of pyridine and 1.0 cc. of acetanhydride are acetylated for 20 hours at room temperature. The crude acetate obtained in the usual manner can be recrystallised from acetone+ether and from methylene chloride. d:l-$\Delta^{5:14:17:18}$-3-ethylenedioxy-11β:18a-oxido-16-oxo-18a-methyl-20 - acetoxy-18-homo-pregnatetraene - 21 - acid-N - acetyl benzylamide melts at 203–205° C. (with decomposition).

Ultraviolet spectrum in absolute alcohol: Maximum at 265 mµ (ε=14600). Infrared spectrum in methylene chloride: Between 5.5µ and 6.5µ bands at 5.62µ, 5.82µ, 5.88µ, 5.95µ, 6.09µ and 6.22µ.

Example 7

500 mg. of d:l-$\Delta^{5:14:18}$-3-ethylenedioxy-11β:18a-oxido-16:20 - dioxo - 18a-methyl-18-homo-pregnatriene-21-acid methyl ester in 30 cc. of absolute benzene are boiled with 3.0 cc. of pyrrolidine for 90 minutes at 110° C. bath temperature. The reaction mixture is allowed to cool, evaporated to dryness in vacuo, and the residue is crystallized from benzene+hexane to yield about 590 mg. of d:l-$\Delta^{5:14:17:18}$ - 3 - ethylenedioxy-11β:18a-oxido - 16-oxo- 18a-methyl - 20-(N-pyrrolidino)-18-homo-pregnatetraene-21-acid pyrrolidide melting at 146–151° C. (with decomposition). After repeated recrystallization from acetone the compound melts at 152–155° C. (with decomposition).

Ultraviolet spectrum in absolute alcohol: Maxima at 237 m$\mu$ ($\epsilon$=12300) and at 338 m$\mu$ ($\epsilon$=9400). Infrared spectrum in methylene chloride: Bands at 5.97$\mu$, 6.17$\mu$ and shoulder at 6.27$\mu$.

*Example 8*

1.0 gram of the d:l-$\Delta^{5:14:18}$-3-ethylenedioxy-11$\beta$:18a-oxido-16:20 - dioxo - 18a-methyl-18-homo-pregnatriene-21-acid methyl ester described in Example 1 is refluxed in a mixture of 50 cc. of absolute benzene and 5 cc. of anhydrous morpholine for 90 minutes with exclusion of moisture. The reaction mixture is evaporated to dryness in a water-jet vacuum, and the residue is crystallized at 0° C. from a small amount of acetone with the addition of ether. Yield: 1.307 grams of a white powder melting at 176–179° C. (with decomposition). Pure d:l-$\Delta^{5:14:17:18}$-3-ethylenedioxy - 11$\beta$:18a - oxido-16-oxo-18a-methyl-20-(N-morpholino) - 18 - homo-pregnatetraene-21-acid morpholide is obtained by recrystallization in the form of the hydrate which is converted at 174–177° C. (probably with elimination of morpholine) into a product melting at 190–193° C. (with decomposition).

Ultraviolet spectrum in absolute alcohol: Maxima at 247 m$\mu$ ($\epsilon$=12200) and 337 m$\mu$ ($\epsilon$=7950).

To prepare the 21-morpholide it is advantageous to dispense with isolating the 20-enamine which is rather unstable in solution. 15.40 grams of d:l-$\Delta^{5:14:18}$-3-ethylenedioxy - 11$\beta$:18a - oxido-16:20-dioxo-18a-methyl-18-homo-pregnatriene-21-acid methyl ester are refluxed in 150 cc. of absolute benzene with 7.7 cc. of morpholine for 2 hours with exclusion of moisture. The cooled dark-green solution is treated with 200 cc. of an aqueous solution of potassium dihydrogen phosphate of 10% strength, and the mixture is vigorously shaken for 1 hour at room temperature. To break up the emulsion formed 100 cc. of methylene chloride are added, the two layers are separated and the aqueous solution is extracted with methylene chloride. The organic solution are washed with water, combined, dried and evaporated in a water-jet vacuum to yield 17.43 grams of a residue, which is triturated with ether, suction-filtered and washed on the filter with a 1:1-mixture of ether+hexane to yield 16.05 grams of d:l-$\Delta^{5:14:18}$-3-ethylenedioxy - 11$\beta$:18a-oxido-16.20-dioxo-18a-methyl - 18 - homo-pregnatriene-21-acid morpholide as a pale-yellow powder melting at 178–188° C. (with decomposition). A specimen, crystallized from benzene+hexane and benzene+ether, forms fine needles melting at 193–195° C.

Ultraviolet spectrum in absolute alcohol: Maximum at 253 m$\mu$ ($\epsilon$=11850), shoulder at 285 m$\mu$ ($\epsilon$=8180) and 325 m$\mu$ ($\epsilon$=4580). Infrared spectrum in methylene chloride: Up to 6$\mu$ no bands other than the C-H-band. Between 6$\mu$ and 6.5$\mu$ bands at 6.03$\mu$ (broad), 6.25$\mu$ and 6.48$\mu$. Inflexion at 6.15$\mu$.

250 grams of the morpholide described above are dissolved in 25 cc. of glacial acetic acid, heated under nitrogen to 100° C. and 12.5 cc. of water is added to the solution. The mixture is cooled after 30 minutes, poured into water and the product is extracted with methylene chloride. The residue from the methylene chloride solutions (2.237 gram) is crystallized from benzene+ether and yields 1.742 grams of d:l-$\Delta^{4:14:18}$-3-16:20-trioxo-11$\beta$-18a-oxido-18a-methyl - 18 - homo-pregnatriene-21-acid morpholide. A specimen crystallized once more from benzene+ether melts at 155–159° C. (with decomposition) and contains benzene of crystallization which is difficult to remove.

Ultraviolet spectrum: Maxima at 242 m$\mu$ ($\epsilon$=24000) and at 287 m$\mu$ ($\epsilon$=7400) and shoulder at 340 m$\mu$ ($\epsilon$=4000). Infrared spectrum in methylene chloride: Between 6$\mu$ and 6.5$\mu$ bands at 6$\mu$ (broad), 6.17$\mu$, 6.24$\mu$ and 6.49$\mu$.

2.50 grams of the d:l-$\Delta^{5:14:18}$-3-ethylenedioxy-11$\beta$:18a-oxido-16:20 - dioxo - 18a-methyl-18-homo-pregnatriene-21-acid morpholide described above are dissolved in 150 cc. of acetone and stirred with 2.5 grams of freshly calcined potassium carbonate and 10.0 cc. of isopropyl iodide for 3 days under nitrogen at room temperature. The mixture is then concentrated to about 30 cc., benzene is added, and the whole is washed three times with ice water. The aqueous extracts are extracted with benzene. The benzolic solutions yield 2.494 grams of a neutral product (ultraviolet absorption: $\epsilon$=12050 at 261 m$\mu$). Crystallization from acetone+ether yields in two fractions 1.72 grams of crude enol ether. Pure d:l-$\Delta^{5:14:17:18}$-3 - ethylenedioxy - 11$\beta$:18a-oxido-16-oxo-18a-methyl-20-isopropoxy-18-homo-pregnatetraene - 21-acid morpholide, after recrystallization from methylene chloride+methanol, melts at 261–263° C. (in vacuo).

Ultraviolet spectrum in absolute alcohol: Maximum at 261 m$\mu$ ($\epsilon$=14050). Infrared spectrum in methylene chloride: Between 5.75$\mu$ and 6.25$\mu$ bands at 5.94$\mu$, 6.08$\mu$, 6.15 and 6.25$\mu$.

*Example 9*

1.94 grams of the d:l-$\Delta^{5:14:18}$-3-ethylenedioxy-11$\beta$:18a-oxido - 16:20 - dioxo - 18a - methyl - 18 - homo - pregnatriene-21-acid methyl ester described in Example 1 are dissolved in 10 cc. of pyridine, treated with 10 cc. of acetanhydride and kept for 44 hours at 25° C., then poured into 100 cc. of ice water and after 45 minutes repeatedly extracted with benzene. The benzolic solutions are washed with water, dried and evaporated in a water-jet vacuum. The solid residue (2.15 grams) is triturated with ether and suctioned off, yielding 1.94 grams of practically pure d:l-$\Delta^{5:14:17:18}$-3-ethylenedioxy-11$\beta$:18a-oxido - 16 - oxo - 18a - methyl - 20 - acetoxy - 18 - homo-pregnatetraene-21-acid methyl ester melting at 196–200° C.

A specimen crystallized from benzene+hexane and methylene chloride+ether melts at 200–203° C. (in vacuo).

Ultraviolet spectrum in absolute alcohol: Maximum at 259 m$\mu$ ($\epsilon$=15200). Infrared spectrum in methylene chloride: 5.62$\mu$ (enol acetate); 5.75$\mu$ (ester); 5.85$\mu$ (5-ring-ketone); 5.95$\mu$ (dihydropyrane); 6.01$\mu$ (enol); 6.21$\mu$ ($\Delta^{14}$) and 9.11$\mu$ (ketal).

*Example 10*

4.050 grams of the d:l-$\Delta^{5:14:18}$-3-ethylenedioxy-11$\beta$:18a-oxido - 16:20 - dioxo - 18a - methyl - 18 - homo - pregnatriene-21-acid morpholide described in Example 8 are dissolved in 27 cc. of pyridine, treated with 27 cc. of acetanhydride and kept for 22 hours at room temperature. After only 10 minutes the sparingly soluble enol acetate begins to separate as a crystalline precipitate. After the reaction time 100 cc. of hexane are added, the mixture is suction filtered, and the precipitate is washed with hexane on the filter. The filtrate is evaporated to dryness in a water-jet vacuum, and the residue, together with the filter residue, is crystallized from methylene chloride+hexane. In 2 fractions a total of 3.923 grams is obtained of d:l - $\Delta^{5:14:17:18}$ - 3 - ethylenedioxy - 11$\beta$:18a - oxido-16 - oxo - 18a - methyl - 20 - acetoxy - 18 - homo - pregnatetraene - 21-acid morpholide melting at 225–228° C. (with decomposition). A specimen crystallized from methylene chloride+hexane and acetone+ether melts at 229–233° (in vacuo, with decomposition).

Ultraviolet spectrum: Maximum at 266 m$\mu$ ($\epsilon$=19600). Infrared spectrum in methylene chloride: 5.64$\mu$ (enol acetate); 5.86$\mu$ (16-ketone); 5.96$\mu$ (shoulder) (dihydropyrane); 6.08$\mu$ (broad) (enol+amide) and 6.22$\mu$ ($\Delta^{14}$).

Example 11

100 mg. of the d:l-$\Delta^{5:14:18}$-3-ethylenedioxy-11$\beta$:18a-oxido - 16:20 - dioxo - 18a - methyl - 18 - homo - pregnatriene-21-acid methyl ester described in Example 1 are dissolved in 0.5 cc. of dioxane and heated with a solution of 60 mg. of potassium carbonate in 3.0 cc. of water for 2 hours under nitrogen at 80° C. The mixture is then cooled, diluted with water, acidified with potassium dihydrogen phosphate and repeatedly extracted with methylene chloride. The residue from the methylene chloride extracts (100 mg.) is recrystallized from ether and yields 63 mg. of d:l-$\Delta^{5:14:18}$-3-ethylenedioxy-11$\beta$:18a-oxido - 16:20 - dioxo - 18a - methyl - 18 - homo - pregnatriene-21-acid in pale-yellow crystals melting at 204–207° C. (in vacuo).

Ultraviolet spectrum: Maximum at 300 m$\mu$ ($\epsilon$=9600). Infrared spectrum in methylene chloride: 3.04$\mu$ (hydroxyl); 5.85$\mu$ (carboxyl); 6.01$\mu$ (16-ketone) and 6.24$\mu$ (double bond).

Reaction with morpholine in the manner described in Example 6 yields the corresponding 21-morpholide also from the free acid.

Example 12

4.60 grams of sodium metal weighed under benzene are introduced in small portions into 100 cc. of absolute methanol. 4.2 cc. of the sodium methylate solution obtained in this manner are added to 10.0 cc. of absolute benzene, the whole is evaporated to dryness in a water-jet vacuum and then dried for 15 minutes at 80° C. under 15 mm. Hg pressure. 40.0 cc. of absolute benzene and 2.95 grams of oxalic acid dimethyl ester are then added, the volume is made up to 50.0 cc. with benzene and the mixture is shaken well. 1.70 cc. of the resulting clear solution are added to a solution of 65.5 mg. of d:l-$\Delta^{5:14}$-3-ethylene-dioxy-11$\beta$:18-oxido-16-oxo-18-acetoxy-androstadiene in 3.0 cc. of absolute benzene and the whole is stirred for 20 hours under nitrogen at room temperature, then diluted with benzene, washed with 1-molar potassium dihydrogen phosphate solution and water, and the aqueous solutions are extracted once with benzene. The dried benzolic solutions yield 55.2 mg. of a crude product which yields 19 mg. of crystals on being allowed to stand in methanol. Finally, recrystallization from methanol yields pure d:l-$\Delta^{5:14}$-3-ethylenedioxy-11$\beta$-hydroxy - 16:18:20 - trioxo - pregnadiene - 21 - acid methyl ester melting at 204–209° C. which, according to its spectroscopic properties, is present mainly as 11:18:18:20-acetal semiketal.

Ultraviolet spectrum: Maximum at 234 m$\mu$. Infrared spectrum in methylene chloride: 2.82$\mu$ (broad) (hydroxyl); in the carbonyl area bands at 5.83$\mu$ (with inflexions at 5.70$\mu$, 5.76$\mu$ and 5.90$\mu$) and 6.17$\mu$ ($\Delta^{14}$); 9.14$\mu$ (ketal).

The mother liquor of the above oxalic acid ester is evaporated and the residue is allowed to stand for 3 days at room temperature in 0.7 cc. of pyridine and 0.4 cc. of acetanhydride. Usual working up yields 20.6 mg. of a crude product which is crystallized from acetone+ether to yield the 20-acetate of the above oxalic acid ester (it is the d:l$\Delta^{5:14}$-3-ethylenedioxy-11$\beta$:18:18:20-bisoxido - 16 - oxo - 20 - acetoxy - pregnadiene - 21 - acid methyl ester) in the form of crystals melting at 236–240° C.

Ultraviolet maximum at 230 m$\mu$ ($\epsilon$=13750). Infrared spectrum in methylene chloride: Bands at 5.67$\mu$ (ketal acetate) 5.73$\mu$ (ester), 5.77$\mu$ ($\alpha$:$\beta$-unsaturated 16-ketone) and 6.18$\mu$ ($\Delta^{14}$-double bond).

Example 13

A mixture of 290 mg. of d:l-$\Delta^{5:14}$-3-ethylenedioxy-11$\beta$:18 - oxido - 16 - oxo - 18 - tetrahydropyranyloxy-androstadiene, 5 cc. of benzene and 600 mg. of oxalic acid methyl ester is treated while being stirred, in a current of nitrogen, with 100 mg. and 1 hour later with 40 mg. of sodium hydride/oil paste of 50% strength. The mixture is stirred for 24 hours at room temperature, and 0.2 cc. of glacial acetic acid in 4.8 cc. of benzene and then water are added dropwise with ice cooling. The aqueous phase is once more extracted with benzene, and the benzolic solutions are washed twice with water, dried and evaporated. The residue is freed in a high vacuum at 50 to 60° C. from the excess oxalic acid ester, dissolved in 2 cc. of benzene and chromatographed over 5 grams of iron-free norite. The first benzolic fractions contain the $\Delta^{5:14}$ - 3 - ethylenedioxy - 11$\beta$:18 - oxido-16:20 - dioxo - 18 - tetrahydropyranyloxy pregnadiene-21-acid methyl ester; after recrystallization from methylene chloride+ether it melts at 178–179° C. (with decomposition) and gives a reddish violet coloration with ferric chloride. The infrared spectrum in methylene chloride displays the following bands in the carbonyl area: 5.71$\mu$ (ester); 5.86$\mu$ (5-ring-ketone), 6.05$\mu$ (enol) and 6.19$\mu$ ($\Delta^{14}$).

170 mg. of crystalline d:l-$\Delta^{5:14}$-3-ethylenedioxy-11$\beta$:18-oxido - 16:20 - dioxo - 18 - tetrahydropyranyloxy - pregnadiene-21-acid methyl ester in 1.5 cc. of pyridine are stirred in the presence of 1.5 cc. of acetanhydride for 22 hours at room temperature, the mixture is poured into 40 cc. of ice water, and after 45 minutes the solid precipitate is suctioned off and thoroughly washed with water on the filter. The moist filter residue is taken up in methylene chloride, and the solution is dried and evaporated. Crystallization of the residue (189 mg.) from methylene chloride+ether yields 173 mg. of d:l-$\Delta^{5:14:17}$-3 - ethylenedioxy - 11$\beta$:18 - oxido - 16 - oxo - 18 - tetrahydropyranyloxy - 20 - acetoxy - pregnatriene - 21 - acid methyl ester. On being once more recrystallized the resulting pure compound melts at 221–224.5° C. (with decomposition).

Ultraviolet spectrum: Maximum at 265 m$\mu$ ($\epsilon$=15900). Infrared spectrum in methylene chloride: 5.63$\mu$ (enol acetate); 5.76$\mu$ (ester); 5.85$\mu$ (16-ketone); 6.05$\mu$ (enol) and 6.20$\mu$ ($\Delta^{14}$).

Since the enol acetate crystallizes much better and is much easier to purify than the free oxalic acid ester, it is of advantage to acetylate the crude oxalic acid ester condensation product directly and then only to isolate the pure enol acetate. This process is described in the following example:

Example 14

A solution of 3 grams of d:l-$\Delta^{5:14}$-3-ethylenedioxy-11$\beta$:18 - oxido - 16 - oxo - 18 - tetrahydropyranyloxy-androstadiene and 15 grams of oxalic acid dimethyl ester in 24 cc. of benzene is stirred dropwise in a current of nitrogen into a mixture of 15 cc. of benzene and 4.6 gram of 50% sodium hydride in oil, and rinsing is performed twice with 5 cc. and once with 2 cc. of benzene. The whole is stirred for 46 hours at room temperature in a weak current of nitrogen, and while cooling with ice, 4.8 cc. of glacial acetic acid in 25 cc. of ether and after 40 minutes water are slowly added dropwise. The aqueous phase is shaken twice with benzene, and the organic solutions are extracted with water three times, dried and evaporated in vacuo. The residue is freed from the oxalic acid dimethyl ester by being dried in a high vacuum at 50–60° C. and then kept overnight in 6 cc. of pyridine and 6 cc. of acetanhydride at room temperature, during which time crystals separate out. On the following day the product is evaporated to dryness in a high vacuum, dissolved in benzene, again evaporated, and this operation is repeated once more. The residue, freed in this manner from pyridine and acetanhydride, is dissolved in 40 cc. of benzene and chromatographed over 100 grams of silica gel. The fractions elutriated with 4:1 mixtures of benzene and ethyl acetate contain the d:l-$\Delta^{5:14:17}$-3-ethylenedioxy - 11$\beta$:18 - oxido - 16 - oxo - 18 - tetrahydropyranyloxy-20-acetoxy-pregnatriene-21-acid methyl ester which produces no melting point depression with the enol acetate described in Example 13 and has the same ultraviolet spectrum. The yield amounts to 2.6 grams.

*Example 15*

A mixture of 190 mg. of d:l-$\Delta^{5:14}$-3-ethylenedioxy-11β:18 - oxido - 16:20 - dioxo - 18 - tetrahydropyranyloxy-pregnadiene-21-acid methyl ester, 240 mg. of freshly calcined potassium carbonate, 0.6 cc. of freshly distilled isopropyl iodide and 14 cc. of acetone is stirred for 48 hours at 30–35° C. The whole is then poured on to ice and N-caustic soda solution, extracted once with benzene and once with ether, and the organic solutions are shaken once with N-caustic soda solution and ice and three times with water. The organic solutions are dried and evaporated, and the residue is dissolved in 3 cc. of benzene and chromatographed over 6 grams of alumina (activity II). The first benzolic eluates contain d:l-$\Delta^{5:14:17}$ - 3 - ethylenedioxy - 11β:18 - oxido - 16 - oxo-18 - tetrahydropyranyloxy - 20 - isopropoxy - pregnatriene-21-acid methyl ester which after recrystallization from methylene chloride+ether melts at 218–221° C. (with decomposition).

Ultraviolet spectrum: $\epsilon_{260m\mu}=10800$ and $\epsilon_{283m\mu}=10100$. The infrared spectrum (solvent: methylene chloride) displays the following bands in the carbonyl area: 5.74μ (ester); 5.89μ (5-ring-ketone); 6.13μ (enol ether) and 6.19μ ($\Delta^{14}$). The subsequent benzolic and the ethereal fractions contain the d:l-$\Delta^{5:14:16}$-3-ethylenedioxy-11β:18-oxido - 16 - isopropoxy - 18 - tetrahydropyranyloxy - 20-oxo-pregnatriene-21-acid methyl ester which melts at 197–202° C. (with decomposition) after recrystallisation from methylene chloride+ether.

Ultraviolet spectrum: $\epsilon_{254\ m\mu}=8650$; $\epsilon_{291\ m\mu}=5850$; $\epsilon_{332\ m\mu}=6200$. The infrared spectrum in methylene chloride displays between 5.5μ and 6.6μ bands at 5.75μ, 5.9μ, 6.13μ, 6.21μ and 6.55μ.

Hydrogenation of the 16-isopropyl ether and elimination of the isopropoxy residue as described in Example 1 yields the d:l$\Delta^{5:16}$-3-ethylenedioxy-11β:18-oxido-18-tetrahydropyranyl - oxy - 20 - oxo - pregnadiene - 21 - acid methyl ester described in U.S. Patent Application Serial No. 776,692, filed concurrently herewith.

*Example 16*

608 mg. of d:l$\Delta^{5:14:17}$-3-ethylenedioxy-11β:18-oxido-16-oxo - 18 - tetrahydropyranyloxy - 20 - acetoxy - pregnatriene-21-acid methyl ester are kept for 3 days at 0 to 5° C. in 22.5 cc. of a mixture containing 10 parts by volume of morpholine and 1 part by volume of water, and the mixture is then evaporated almost to dryness under 0.1 mm. Hg pressure.

The morpholide obtained in this manner is sufficiently pure for the subsequent acetylation. A specimen of the pure d:l - $\Delta^{5:14}$ - 3 - ethylenedioxy - 11β:18 - oxido-16:20 - dioxo - 18 - tetrahydropyranyloxy - pregnadiene-21-acid morpholide, crystallized from ether, melts at 182–185° C. (with decomposition).

Ultraviolet spectrum: Maximum at 249 mμ ($\epsilon=12500$), shoulder at 290 mμ ($\epsilon=6100$) and at 325 mμ ($\epsilon=3400$). Infrared spectrum in methylene chloride: Between 5.75μ and 6.25μ bands at 5.79μ, 589μ, 6.06μ and 6.19μ.

10 cc. of benzene and 7.5 cc. of pyridine are added to the crude morpholide and while cooling the mixture with ice 7.5 cc. of acetanhydride are added to it and it is kept for 48 hours at room temperature. It is then evaporated to dryness under 0.1 mm. Hg pressure, and the residue is taken up in benzene and repeatedly washed with water. The aqueous extracts are once more extracted with benzene. The benzolic solutions are combined, dried and evaporated and by crystallizing the residue from ether there are obtained 600 mg. of practically pure d:l-$\Delta^{5:14:17}$-3-ethylenedioxy-11β:18-oxido-16-oxo - 18 - tetrahydropyranyloxy-20-acetoxy-pregnatriene-21-acid morpholide melting at 220–223° C. (with decomposition).

Ultraviolet spectrum: Maximum at 270 mμ ($\epsilon=13600$). Infrared spectrum in methylene chloride: Between 5.5μ and 6.25μ bands at 5.64μ (enol acetate); 5.86μ (16-ketone); 6.08μ (amide+enol) and 6.19μ ($\Delta^{14}$).

What is claimed is:

1. Process for the manufacture of 16:20-dioxygenated pregnene-21-acid derivatives, wherein a $\Delta^{5:14}$-16-oxo-androstadiene compound of the formula

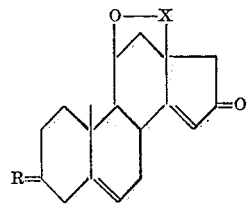

wherein R represents a ketalized oxo group and X is selected from the group consisting of

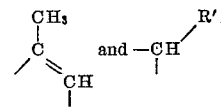

and R' represents an etherified hydroxyl group, is condensed with an oxalic acid dialkyl ester.

2. Process according to claim 1, wherein there is used as starting material the $\Delta^{5:14:18}$-3-ethylenedioxy-11β:18a-oxido-16-oxo-18a-methyl-18-homo-androstatriene.

3. Process according to claim 1, wherein there is used as starting material the $\Delta^{5:14}$-3-ethylenedioxy-11β:-18-oxido-16-oxo-18-acetoxy-androstadiene.

4. Process according to claim 1, wherein there is used as starting material the $\Delta^{5:14}$-3-ethylenedioxy-11β:18-oxido-16-oxo-18-tetrahydropyranyloxy-androstadiene.

5. Process for the manufacture of 16:20-dioxygenated pregnene-21-acid derivatives, wherein a $\Delta^{5:14}$-16:20-dioxo-pregnadiene-21-acid ester of the formula

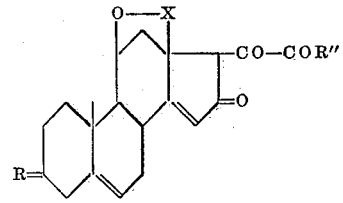

wherein R represents a ketalized oxo group and X is selected from the group consisting of

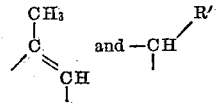

and R' represents an etherified hydroxyl group, and R" represents a lower alkoxy group, is treated with a basic nitrogen compound having at least one hydrogen atom attached to the nitrogen atom to form the corresponding 21-acid amide.

6. Process according to claim 5, wherein the amine used is morpholine.

7. Process according to claim 6, wherein the condensation product is treated with an acylating agent selected from the group consisting of a reactive derivative of a lower fatty acid, a monocyclic carbocyclic carboxylic acid and a phenyl-substituted lower fatty acid and the resulting 20-enol acylate is isolated.

8. A process of claim 7, wherein the acylating agent is a reactive derivative of acetic acid.

9. Compounds of the formula:

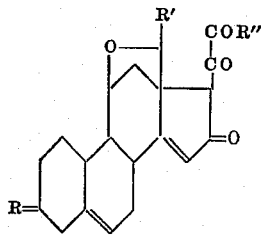

wherein R represents a ketalized oxo group, R' a tetrahydropyranyloxy group, and R" a member selected from the group consisting of a free hydroxyl group, a lower alkoxy group and a substituted amino group selected from the group consisting of lower alkyl amino, di-lower alkylamino, phenyl lower alkylamino, cyclo-lower alkylamino and heterocyclic amino.

10. A member selected from the group consisting of lower alkyl enol ethers and enol esters derived from a member selected from the group consisting of lower fatty acids, monocyclic carbocyclic carboxylic acids and phenyl substituted lower fatty acids, of the compounds claimed in claim 9.

11. The $\Delta^{5:14}$-3-ethylenedioxy-11$\beta$:18-oxido-16:20-dioxo -18 - tetrahydropyranyloxy - pregnadiene - 21 - acid-methyl ester.

12. The $\Delta^{5:14}$-3-ethylenedioxy-11$\beta$:18-oxido-16:20-dioxo - 18 - tetrahydropyranyloxy - pregnadiene - 21 - acid morpholide.

13. The $\Delta^{5:14:17}$-3-ethylenedioxy-11$\beta$:18-oxido-16-oxo-18 - tetrahydropyranyloxy - 20 - acetoxy - pregnatriene-21-acid methyl ester.

14. The $\Delta^{5:14:17}$-3-ethylenedioxy-11$\beta$:18-oxido-16-oxo-18 - tetrahydropyranyloxy - 20 - acetoxy - pregnatriene-21-acid morpholide.

References Cited in the file of this patent
UNITED STATES PATENTS
2,844,513   Wettstein et al. _____ July 22, 1958

OTHER REFERENCES

Heusler et al: Helv. Chim. Acta., vol. 41, No. 4, pages 997–1017 (June 1958).

UNITED STATES PATENT OFFICE
Certificate of Correction

Patent No. 3,002,970            October 3, 1961

Albert Wettstein et al.

It is hereby certified that error appears in the above numbered patent requiring correction and that the said Letters Patent should read as corrected below.

Column 1, formula I should appear as shown below instead of as in the patent:

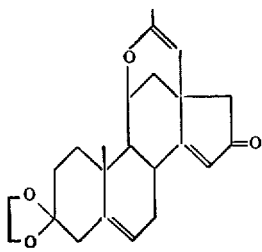

same column 1, formula VI should appear as shown below instead of as in the patent:

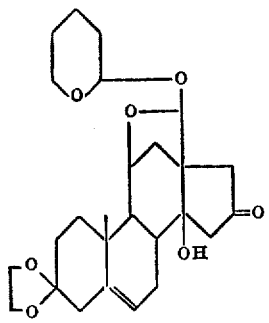

columns 3 and 4, formula IX should appear as shown below instead of as in the patent:

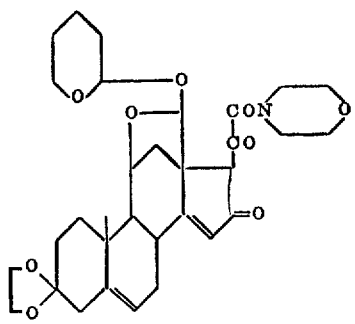

same columns 3 and 4, formula XI should appear as shown below instead of as in the patent:

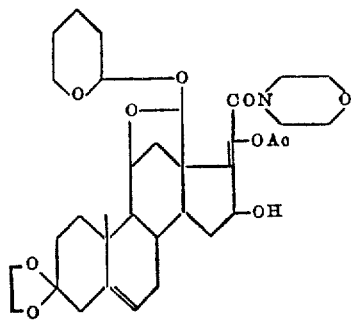

same columns 3 and 4, below formula XVI, for $\begin{vmatrix} Cr_1O- \\ pyridine \end{vmatrix}$    read    $\begin{vmatrix} CrO_3- \\ pyridine \end{vmatrix}$ column 7, lines 20 to 30, the formula should appear as shown below instead of as in the patent:

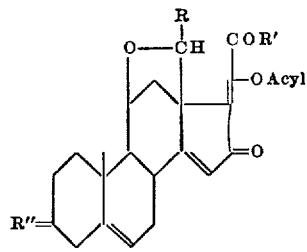

column 9, line 3, for "cholride" read —chloride—; line 18, for "-handrostatriene" read — -androstatriene- —; column 11, line 47, for "-16.20-dioxo-" read — -16:20-dioxo- —; column 15, line 61, for "589μ" read —5.89μ—; column 16, line 34, for "-11β:-18-" read — -11β:18- —.

Signed and sealed this 26th day of June 1962.

[SEAL]
Attest:
ERNEST W. SWIDER,
*Attesting Officer.*

DAVID L. LADD,
*Commissioner of Patents.*